(12) United States Patent
Mantzouratos

(10) Patent No.: US 11,086,947 B1
(45) Date of Patent: Aug. 10, 2021

(54) EFFICIENT UNIQUES QUERYING

(71) Applicant: Tubular Labs, Inc., Mountain View, CA (US)

(72) Inventor: Ioannis Mantzouratos, San Francisco, CA (US)

(73) Assignee: Tubular Labs, Inc., Mountain View, CA (US)

(*) Notice: Subject to any disclaimer, the term of this patent is extended or adjusted under 35 U.S.C. 154(b) by 0 days.

(21) Appl. No.: 16/600,156

(22) Filed: Oct. 11, 2019

(51) Int. Cl.
G06F 16/30 (2019.01)
G06F 16/951 (2019.01)
G06F 16/248 (2019.01)
G06F 16/22 (2019.01)
G06F 16/2455 (2019.01)
G06F 16/93 (2019.01)
G06F 16/9535 (2019.01)

(52) U.S. Cl.
CPC ........ G06F 16/951 (2019.01); G06F 16/2255 (2019.01); G06F 16/248 (2019.01); G06F 16/2455 (2019.01); G06F 16/93 (2019.01); G06F 16/9535 (2019.01)

(58) Field of Classification Search
CPC .. G06F 16/951; G06F 16/248; G06F 16/2255; G06F 16/2455; G06F 16/93; G06F 16/9535
USPC ........................................................ 707/706
See application file for complete search history.

(56) References Cited

U.S. PATENT DOCUMENTS

| | | | |
|---|---|---|---|
| 9,390,154 B1* | 7/2016 | Baird, III | G06F 16/27 |
| 2006/0116989 A1* | 6/2006 | Bellamkonda | G06F 16/24556 |
| 2009/0158046 A1* | 6/2009 | Milliken | H04L 51/12 |
| | | | 713/181 |
| 2010/0114842 A1* | 5/2010 | Forman | G06F 16/2255 |
| | | | 707/692 |
| 2012/0030743 A1* | 2/2012 | Semba | G06K 9/00087 |
| | | | 726/7 |
| 2015/0186403 A1* | 7/2015 | Srivastava | G06F 16/215 |
| | | | 707/692 |
| 2016/0117736 A1* | 4/2016 | Dasdan | H04L 67/306 |
| | | | 705/14.66 |
| 2017/0004526 A1* | 1/2017 | Morovati | H04N 21/44222 |
| 2018/0205552 A1* | 7/2018 | Struttmann | H04L 9/0637 |

OTHER PUBLICATIONS

Cohen et al., Leveraging Discarded Samples for Tighter Estimation of Multiple-Set Aggregates, Sigmetrics/Performance '09, Jun. 2009.

* cited by examiner

Primary Examiner — Kuen S Lu
(74) Attorney, Agent, or Firm — Van Pelt, Yi & James LLP

(57) ABSTRACT

Efficient uniques querying is disclosed, including: receiving a search query for a number of unique audience members across a plurality of groups of audience members; obtaining a plurality of sets of representations corresponding to respective ones of the plurality of groups of audience members; selecting at least a subset from each of the plurality of sets of representations; merging the selected at least subsets of the plurality of sets of representations into a merged set of representations; determining the number of unique audience members across the plurality of groups of audience members based at least in part on the merged set of representations; and outputting the number of unique audience members across the plurality of groups of audience members.

20 Claims, 10 Drawing Sheets

| Keyword(s) | Number of Channels | Actual Unique Audience Members | Described Unique Audience Members Estimate | Naïve Unique Audience Members Estimate |
|---|---|---|---|---|
| Brand A | 5 | 360,782 | 386,896 +7.24% | 376,134 +4.26% |
| Brand B | 6 | 4,233,922 | 4,202,128 -0.75% | 5,988,748 +41% |
| Topic A | 64 | 7,757,550 | 7,723,699 -0.44% | 10,144,704 +30.7% |
| Topic B | 70 | 9,259,545 | 9,227,100 -0.35% | 13,371,565 +44.4% |
| Topic C | 77 | 7,127,302 | 7,223,810 +1.35% | 14,558,189 +104.2% |
| Topic D | 1169 | 72,167,556 | 70,748,788 -1.97% | 169,609,904 +135% |

FIG. 10

EFFICIENT UNIQUES QUERYING

BACKGROUND OF THE INVENTION

It is desirable to know the number of unique users that engage with two or more pieces of media (e.g., videos) so that such information can help media providers (e.g., content providers and advertisers) be informed on types of content to provide. A first, conventional technique of determining the number of unique users involves obtaining all the user identifiers of users that have engaged with two or more specified pieces of media and deduplicating all the duplicate user identifiers. The number of remaining, unique user identifiers is used as the number of unique users that have engaged in the two or more specified pieces of media. However, deduplicating a large number of user identifiers requires significant storage space to store the user identifiers and also considerable memory to perform the deduplication process. Furthermore, due to the size of the computation, a queried number of unique users corresponding to more than one piece of media cannot be computed in real-time.

A second, naïve technique of determining the number of unique users involves precomputing and storing the number of unique users corresponding to each, single piece of media. However, when a query requests for the number of unique users across two or more pieces of media, the sum of the respective, pre-computed number of unique users corresponding to each of the pieces of media will likely be inaccurate because such a sum would count the same user that engaged with more than one of the pieces of media multiple times.

A third conventional technique of determining the number of unique users involves precomputing the number of unique users corresponding to predetermined combinations of two or more pieces of media. However, such computations are resource intensive and furthermore, few of such precomputed values will end up satisfying actual queries that are received during runtime.

BRIEF DESCRIPTION OF THE DRAWINGS

Various embodiments of the invention are disclosed in the following detailed description and the accompanying drawings.

FIG. 8 is a diagram showing an example of determining the number of unique audience members across a plurality of groups of audience members.

FIG. 10 is a diagram showing a table showing the estimated numbers of unique audience members that are determined for a set of channels.

DETAILED DESCRIPTION

Figure 1:
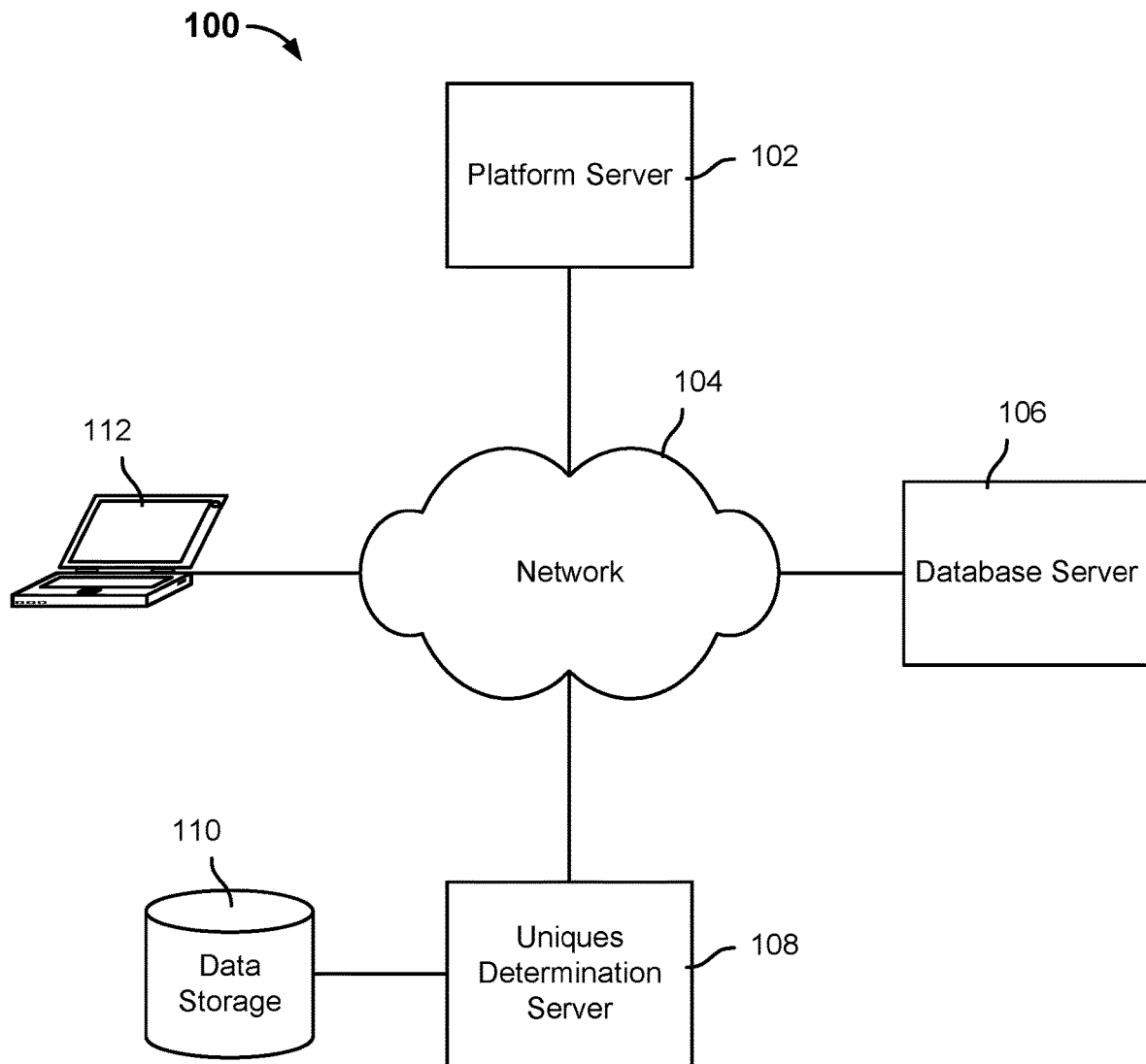
FIG. 1 is a diagram showing an embodiment of a system for performing efficient unique audience members querying.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of efficient unique audience members querying are described herein. A search query for a number of unique audience members across a plurality of groups of audience members is received. In various embodiments, a "group of audience members" is a group of users that meet a set of audience member criteria. For example, a set of audience member criteria describes users that have watched the same video or video(s) from the same channel of one or more videos, engaged with the same video or the same channel of one or more videos, and/or subscribed to the same video or the same channel of one or more videos. Sets of representations corresponding to various groups of audience members are obtained. In some embodiments, a set of representations corresponding to a group of audience members may be used to determine a unique number of audience members that is included in that group. In some embodiments, a set of representations corresponding to a group of audience members may be computed from the user identifiers (IDs) corresponding to the audience members of that group. An at least subset of representations is selected from each of the plurality of sets of representations. In some embodiments, at least a subset of representations is selected from the set of representations corresponding to each group of audience members based on a comparison with a selected value from the plurality of sets of representations. The selected subsets of representations are then combined into a merged set of representations. In various embodiments, any duplicate representations in the merged set are removed and the remaining representations are sorted. The number of unique audience members across the plurality of groups of audience members is determined based on the merged set of representations.

FIG. 1 is a diagram showing an embodiment of a system for performing efficient unique audience members querying. In the example of FIG. 1, system 100 includes platform server 102, network 104, database server 106, uniques determination server 108, raw data storage 110, and client device 112. Network 104 may be implemented using high-speed data and/or telecommunications networks. Platform server 102, database server 106, uniques determination server 108, and client device 112 communicate to each other over network 104.

Platform server 102 is configured to track and store metadata corresponding to items that are available at its platform (e.g., an online video hosting platform). For example, the platform comprises an online video hosting platform and as such, platform server 102 is configured to store (e.g., static) metadata such as, for example, keywords associated with the video, the title of the video, the uploading user, and the upload date of each video. In the example of the platform comprising an online video hosting platform, platform server 102 is also configured to capture information associated with users that interact with the videos. In various embodiments, platform server 102 is configured to assign a user identifier (ID) to each user that interacts with a video. In various embodiments, a user ID comprises an anonymized string that uniquely represents an individual. In the example of the platform comprising an online video hosting platform, videos may be organized into "channels," where a channel is associated with one or more videos. For example, a user interaction with a video may include viewing (at least a portion of) the video, indicating a (e.g., positive or negative) sentiment with respect to the video, posting a comment to the video, and/or subscribing to the video or its corresponding channel.

Uniques determination server 108 is configured to (e.g., periodically) collect user IDs of users that have interacted with items from platform servers such as platform server 102. For example, uniques determination server 108 is configured to collect user IDs of users that have interacted with items from platform servers for the purpose of determining the number of unique audience members with respect to a single item or across multiple items. Uniques determination server 108 is configured to store the collected user IDs in data storage 110. While data storage 110 is shown to be local to uniques determination server 108 in system 100 in FIG. 1, in another example, data storage 110 may be a remote storage repository that is operated by a third party service (e.g., Amazon S3). In some embodiments, uniques determination server 108 is configured to obtain metadata from platform servers such as platform server 102 periodically and/or in response to a detected event. In some embodiments, uniques determination server 108 is configured to obtain metadata from platform servers such as platform server 102 via an application program interface (API) that is provided by the platform server and/or through other techniques.

As mentioned above, in various embodiments, a "group of audience members" is a group of users that meets a set of audience member criteria. In various embodiments, a set of audience member criteria describes users that perform a specified activity or interaction with respect to one or more items that are hosted at a platform server such as platform server 102. For example, if an item were a video, a set of audience member criteria may describe users that have watched the same video or the same channel of one or more videos, engaged with the same video or the same channel of one or more videos, and/or subscribed to the same video or the same channel of one or more videos. As such, a group of audience members comprises the users' respective user IDs. However, the users that are included in a group of audience members are not deduplicated, which is to say that a group of audience members may include multiple of the same user ID if the corresponding user had met the audience member criteria for the group multiple times. For example, if the audience member criteria were "having viewed a video," then a user who had viewed Video A five times will have his or her user ID included five times into the group of audience members associated with Video A. As such, the user IDs that are associated with a group of audience members need to be processed in order to estimate the unique number of users (user IDs) that are actually included in the group of audience members.

In various embodiments, uniques determination server 108 is configured to store metadata associated with each group of audience members with respect to one or more items that are associated with platform server 102 in corresponding one or more document(s). In various embodiments, a "document" comprises a record or a plurality of fields that stores information corresponding to a group of audience members. For example, a "document" is a JSON file. For example, a group of audience member-specific documents stores static information corresponding to the group of audience members such as, for example, keywords associated with the item(s) for which the group includes users that are audience members, the title of the item(s), the uploading user, and the upload date of each item.

In various embodiments, uniques determination server 108 is configured to generate a set of representations based on the user IDs associated with a group of audience members. The set of representations is a lightweight set of data that is derived from the user IDs that are associated with the users in a group of audience members and the set of representations can be used to approximate the number of unique users that are included in the group of audience members. In some embodiments, uniques determination server 108 is configured to input each user ID that is associated with a group of audience members into one or more hash functions (e.g., murmur3) to generate a corresponding hash value for the user ID. In various embodiments, the hash value that is generated by the one or more hash functions from a user ID is a hash value that is within the range of [0, 1] or another range that can be normalized to be [0, 1]. All the hash values that have been determined for user IDs associated with a group of audience members are deduplicated and sorted, and then the smallest, predetermined number, k, of the unique hash values ("minimum hash values") is stored as the set of representations in a document corresponding to the group of audience members. For example, k is configured to be 400. The set of k minimum hash values corresponding to a group of audience members is sometimes referred to as a "sketch." In various embodiments, uniques determination server 108 is configured to store a group of audience members' set of representations in the group's corresponding document.

In various embodiments, documents that are specific to groups of audience members are stored by uniques determination server 108 at database server 106. In various embodiments, database server 106 comprises a database that indexes and stores documents, such as documents that correspond to groups of audience members, for fast retrieval. In some embodiments, at least some item-specific documents are also stored at uniques determination server 108.

In some embodiments, uniques determination server 108 is configured to update a set of representations corresponding to a group of audience members when it is determined that a new user ID is associated with the group. In some embodiments, during an instance of collecting user IDs from a platform server such as platform server 102, uniques determination server 108 determines that one or more new user IDs are collected with respect to a group of audience members, and uniques determination server 108 is configured to determine whether the set of representations associated with the group of audience members should be updated. To determine whether the set of representations associated with the group of audience members should be updated, in some embodiments, uniques determination server 108 is configured to input each of the new user IDs to one or more hash functions (e.g., murmur3) to generate a corresponding new hash value for the new user ID. Uniques determination server 108 is configured to obtain the existing set of representations (e.g., a sorted list of hash values) corresponding to the group of audience members from a corresponding document that is stored by database server 106 and determine whether each new hash value is smaller than the largest existing hash value in the list. If a new hash value is smaller than the largest existing hash value, then the new hash value is inserted into the corresponding position of the sorted list of hash values and then the largest hash value of the list is discarded. Uniques determination server 108 is configured to provide a user interface for receiving a search query for an estimated number of unique audience members within a single group of audience members or across multiple groups of audience members. In some embodiments, the user interface is exposed to a user via an application or a website. For example, a user may access such a user interface via client device 112. The user interface may comprise fields and/or selections for criteria of metadata related to groups of audience members. In various embodiments, a search query may specify criteria for determining a number of unique audience members across matching group(s) of audience members. In response to receiving a search query, in various embodiments, uniques determination server 108 is configured to query database server 106 for documents that match the search query and generate a search result based on the contents of the matching documents. In some embodiments, uniques determination server 108 sends to database server 106 custom computer code (e.g., a software plug-in) that, when executed, is configured to cause database server 106 to locate the matching documents and determine a unique number of audience members across one or more matching groups of audience members based on the matching documents in response to a search query that is sent from uniques determination server 108. Regardless of where the number of uniques computations are performed (e.g., at either uniques determination server 108 or database server 106) or where item-specific documents are stored (e.g., at either uniques determination server 108 or database server 106), matching documents to a search query are obtained at the documents' storage source and a search (e.g., number of uniques) result is generated based on such matching documents. In some embodiments, the uniques determination for a search query is performed local to the location at which the matching item-specific document(s) are found so that the computations can be performed faster (i.e., data associated with the found matching documents does not need to be transmitted over network 104 to a different entity for that entity to perform the aggregation computations). In one example, uniques determination server 108 has sent computer code (e.g., a software plug-in) to database server 106, which is configured to store item-specific documents. When executed by a processor, the computer code is configured to, at least, locate the matching documents to a search query that is sent from uniques determination server 108, and perform uniques determination based on the matching documents in response to the search query. After uniques determination server 108 receives a search query from client device 112, uniques determination server 108 is configured to send the search query to database server 106, which is configured to execute the previously received computer code to locate the matching documents to that search query and perform uniques determination computations based on the matching documents. In another example, uniques determination server 108 is configured to use the set of representations stored in the corresponding document of each matching group of audience members to determine the number of unique audience members across all the matching group(s) of audience members.

For example, if the search query requests for the number of unique audience members to be determined for all video channels that include the term "talk show," then matching documents corresponding to groups of audience members associated with the term "talk show" are obtained from the document storage source. For example, five such documents are obtained, where each document corresponds to one of the groups of audience members of "Talk Show A," "Talk Show B," "Talk Show C," "Talk Show D," and "Talk Show E." The sets of representations from respective ones of the five matching documents are then used to determine the number of unique audience members across groups of audience members associated with "Talk Show A," "Talk Show B," "Talk Show C," "Talk Show D," and "Talk Show E."

Uniques determination server 108 is configured to generate a visualization of the search results generated in response to a search query. For example, in response to a search query for the number of unique audience members for items that match a specified term, uniques determination server 108 is configured to generate a textual and/or image-based output based on the determined number of unique audience members. If the search query had been received from client device 112, uniques determination server 108 is configured to send the visualization of the search results to client device 112 so that the visualization can be presented at a user interface that is presented at client device 112.

Figure 2:
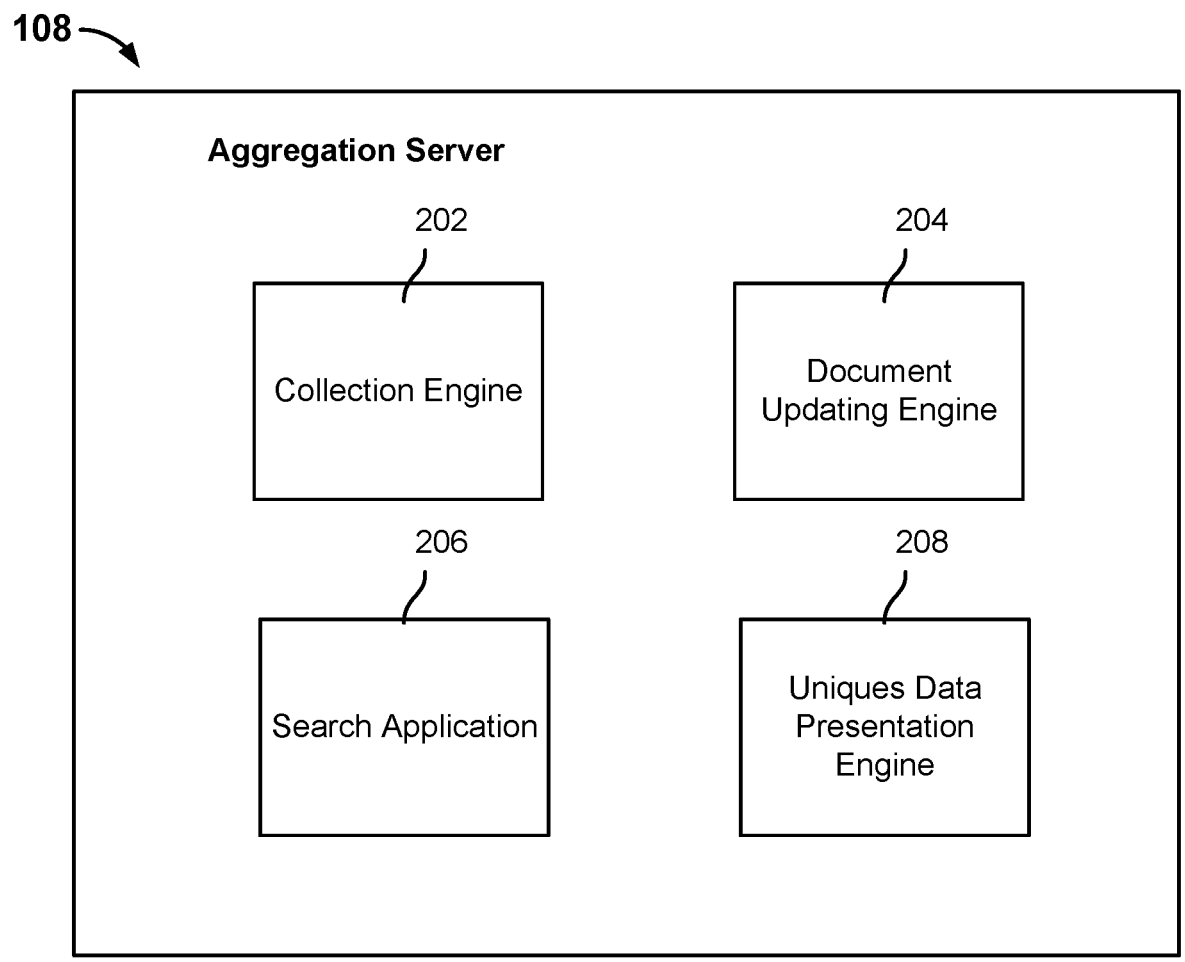
FIG. 2 is a diagram showing an example of a uniques determination server.

FIG. 2 is a diagram showing an example of a uniques determination server. In some embodiments, uniques determination server 108 of system 100 of FIG. 1 may be implemented using the example of FIG. 2. In FIG. 2, the example uniques determination server includes collection engine 202, document updating engine 204, search application 206, and uniques data presentation engine 208.

Collection engine 202 is configured to collect metadata associated with items from one or more platform servers. In some embodiments, collection engine 202 is configured to obtain metadata associated with the items from one or more platform servers on a periodic basis (e.g., once a day) and/or in response to detected events. In some embodiments, collection engine 202 is configured to collect only new and/or metadata associated with an item relative to the previous time that it collected metadata associated with that item. In some embodiments, collection engine 202 is configured to only collect metadata associated with select items that match a set of collection criteria (e.g., items that had been uploaded or otherwise made available at a platform server within a predetermined amount of time, items that are associated with trending tags, etc.). In some embodiments, collected metadata comprises user IDs corresponding to groups of audience members with respect to one or more items that are associated with a platform server. For example, if the item were a video and a set of audience member criteria were for users that watched videos associated with "talk show" channels, then the collected data may include the user IDs of users that have watched videos associated with channels that include the term "talk show," where the user IDs associated with users that have watched videos belonging to the same channel are included in the same group of audience members. Collection engine 202 is configured to store the collected metadata at a data storage that may or may not be local to the uniques determination server.

Document updating engine 204 is configured to analyze the collected metadata associated with a group of audience members and update the group-specific document(s) based on the analyzed collected metadata. Document updating engine 204 is configured to periodically analyze the collected metadata that is stored at a data storage to update the group-specific documents associated with various groups of audience members, where the group-specific documents are stored at a database server, which has indexed the documents for efficient searching. Document updating engine 204 is configured to identify new and/or changed static metadata corresponding to an item and update the item-specific document(s) corresponding to the item by, for example, sending the updated static metadata to the database server. Document updating engine 204 is configured to identify new user IDs corresponding to a group of audience members and then update the corresponding group-specific document(s) accordingly. Specifically, in some embodiments, document updating engine 204 is first configured to obtain, from a database server, a document corresponding to a group of audience members for which new user IDs that match the set of audience member criteria associated with that group have been collected. Based on the existing set of representations (e.g., a sorted list of k unique hash values) that is already stored in the group-specific document, document updating engine 204 is configured to determine whether any hash values in the existing set of representations is to be replaced by a new hash value that is determined from a new user ID.

Search application 206 is configured to obtain a search query for the number of unique audience members across one or more groups of audience members. In some embodiments, the search query is obtained from a user interface. For example, if the items comprise videos, the search query may include video attributes (e.g., keywords, names of channels), the number of views that the video(s) have, one or more platforms at which the video(s) are hosted, the language(s) that are associated with the video(s), and the length of the video(s). Search application 206 is configured to determine one or more matching documents corresponding to respective groups of audience members that match at least a portion of a search query. For example, a matching document comprises a document whose static metadata (e.g., video keywords, video title, video publisher, time at which the video was uploaded) matches one or more attributes that are included in a search query. To generate the search result for a search query that requests for a number of unique audience members across one or more groups of audience members, in some embodiments, search application 206 is configured to read the respective set of representations that is stored in each of the matching documents. In some embodiments, search application 206 is configured to determine the maximum hash value from each of the sets of representations and then determine the smallest hash value of the maximum hash values as selected value M. In some embodiments, search application 206 is then configured to exclude any hash values from each of the sets of representations that are greater than M from being merged into a merged list. In some embodiments, search application 206 is configured to merge the remaining hash values from the sets of representations into a merged set of representations (e.g., a merged list of sorted at least k unique hash values). Any duplicate values in the merged set of representations are removed. In some embodiments, search application 206 is configured to determine an approximate number of unique audience members across the group(s) of audience members whose corresponding documents had matched the search query. Specifically, in some embodiments, given that the merged list of representations is sorted by magnitude, search application 206 is configured to determine the average distance between adjacent representations (e.g., hash values) in the merged set of representations and determine the number of unique audience members across the group(s) of audience members whose corresponding documents had matched the search query as the quotient of one divided by the average distance. In some embodiments, another technique of determining the number of unique audience members across the group(s) of audience members whose corresponding documents had matched the search query is the quotient of one less than the number of unique hash values of the merged list divided by M (the largest hash value in the merged list).

In some embodiments, at least some functions described for search application 206 with respect to determining the number of unique audience members across one or more groups of audience members may be performed by another entity other than search application 206 of the uniques determination server. In some instances, such functions may even be performed by another entity outside of the uniques determination server, such as by, for example, a custom plug-in that is executing at the database server at which the group of audience members' specific documents are stored.

Uniques data presentation engine 208 is configured to obtain the uniques result from search application 206. In some embodiments, the uniques result comprises a value that represents the number of unique audience members across one or more groups of audience members that match a search query. In some embodiments, the uniques search result is presented along with one or more other pieces of information. In some embodiments, the uniques search result may be presented with the search query, the number of unique audience members per each matching group of audience members, and/or the total number of non-unique audience members across the one or more matching groups of the search query.

In contrast to conventional techniques of determining the number of uniques that required the processing of all user IDs that pertain to groups of users to determine the number of unique individuals, various embodiments described herein enable the number of unique audience members across one or more groups of audience members to be quickly determined in real-time because lightweight data (sets of representations) that has already been computed for each group of audience members can be quickly retrieved from the group-specific documents to estimate, with a high degree of accuracy, the number of unique audience members across the groups. Furthermore, unlike conventional techniques of determining the number of uniques, offline processes are no longer needed to determine the number of uniques across one or more predicted combinations of groups of users, as various embodiments enable such determinations to be performed in real-time for group(s) of audience members that actually match a user's submitted search query.

Figure 3:
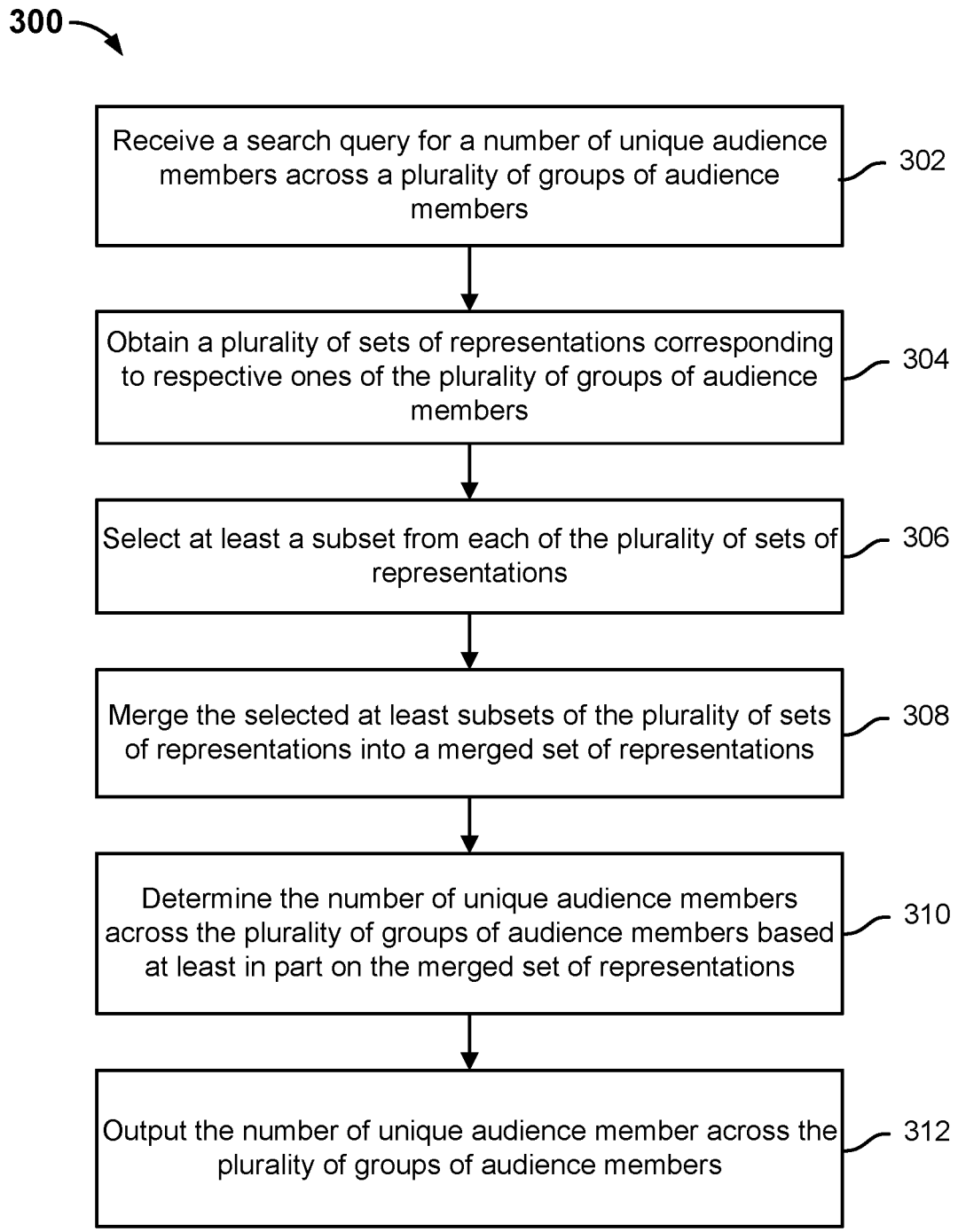
FIG. 3 is a flow diagram showing an embodiment of a process for performing efficient unique audience members querying.

FIG. 3 is a flow diagram showing an embodiment of a process for performing efficient unique audience members querying. In some embodiments, process 300 is implemented at system 100 of FIG. 1. Specifically, in some embodiments, process 300 is implemented at uniques determination server 108 and/or database server 106 of system 100 of FIG. 1.

At 302, a search query for a number of unique audience members across a plurality of groups of audience members is received. In some embodiments, the search query includes one or more attributes that describe a group of audience members. For example, the search query includes one or more attributes that describe the one or more items for which a group of users is audience members.

At 304, a plurality of sets of representations corresponding to respective ones of the plurality of groups of audience members is obtained. For each group of audience members that matches the search query, a corresponding set of representations is retrieved. In some embodiments, documents corresponding to groups of audience members are compared against the search query and documents that include metadata that match the search query are determined as matching documents. In some embodiments, each such matching document (which is associated with a corresponding group of audience members) includes a set of representations corresponding to that group of audience members. In various embodiments, a set of representations corresponding to a group of audience members can be used to estimate the number of unique audience members within that group. In some embodiments, a set of representations comprises a sorted list of unique hash values that were derived from user IDs that were collected for the group of audience members from a platform server. For example, a set of hash values corresponding to a group of audience members includes a predetermined number, k, of hash values. In various embodiments, each hash value is a value within the (normalized) range of [0, 1]. In various embodiments, each hash value had been generated by applying the same hash function(s) to a corresponding user ID.

At 306, at least a subset is selected from each of the plurality of sets of representations. In various embodiments, zero or more representations of each set of representations are determined to be excluded from a merge process based on a comparison to a selected value. In some embodiments, the maximum representation (e.g., hash value) from each set of representations is determined and the smallest of all such maximum representations is determined as the selected value M. In some embodiments, any representations of a set of representations that are larger than the selected value M is excluded from being merged into a merged set. The remaining representations from each set are selected for merging.

At 308, the selected at least subsets of the plurality of sets of representations are merged into a merged set of representations. The remaining, non-excluded representations from each set are selected to be merged into a single, merged set of representations. In various embodiments, the representations that are included in the merged set are sorted and also deduplicated. For example, the merged set of representations comprises a list of sorted, unique representations that are each less than or equal to selected value M. In some embodiments, because each set of representations had originally included (up to) k representations, the merged set of representations includes at least k representations.

At 310, the number of unique audience members across the plurality of groups of audience members is determined based at least in part on the merged set of representations. In some embodiments, the distance (difference) is computed between each pair of (sorted) adjacent representations (e.g., hash values) within the merged set of representations. In some embodiments, the average distance (difference) is determined. In some embodiments, the number of unique audience members across the plurality of groups of audience members is determined as a function of the average distance. For example, the number of unique audience members across the plurality of groups of audience members is determined as one divided by the average distance. The average distance between sorted, adjacent representations (each a value in the (normalized) range of [0, 1]) in the merged set of representations can be used to approximate the number of unique audience members across group(s) of audience members because it is presumed that the hash function that was used to generate the hash values from user IDs for each group of audience members distributes its inputs uniformly across [0, 1]. As such, the expected average distance between sorted, adjacent hash values should be one divided by the number of unique inputs (user IDs).

At 312, the number of unique audience members across the plurality of groups of audience members is output. The number of unique audience members across the plurality of groups of audience members is presented at a user interface. In some embodiments, the number of unique audience members across the plurality of groups of audience members is presented along with one or more other pieces of information. For example, such other pieces of information include the search query, the number of unique audience members per each matching group of audience members, and/or the total number of non-unique audience members across the one or more matching groups of the search query.

For example, the determination of the number of unique audience members across a plurality of groups of audience members can be used as exploratory analysis to get a better grasp of the size of various market segments, how well a group of videos or channels cover that segment, and what is the viewing/engagement behavior of the audience in that segment. For example, the determined number of unique audience members can also be compared to other aggregated statistics, such as, for example, the total number of views across the groups of audience members, to come up with numbers that describe the average behavior of an individual from that group: average views per person, average number of comments per person, etc. Then benchmarks can be created that compare and/or rank different audience groups—for example, on average, an audience member of "Topic A" videos engages 1,000 times a month, whereas an audience member of "Topic B" videos engages 15,000 times. As another example, the number of unique audience members across groups of audience members can be used as an input into another system that is configured to recommend to users (i.e., owners/administrators of a video channel) other channels they can work with in order to maximize their reach within a specific audience group. For example, the recommendation system can determine whether a user that runs a channel titled "Talk Show A" will reach more new people by collaborating with either "Channel X" or "Channel Y." The recommendation system could generate this recommendation by comparing the number of unique audience members across the "Talk Show A" channel and "Channel X" against the number of unique audience members across the "Talk Show A" channel and "Channel Y."

As shown by process 300, various embodiments described herein can quickly compute the number of unique audience members across multiple groups of audience members by retrieving and merging their precomputed corresponding sets of representations. These efficient computations enable search queries for the number of unique audience members across multiple groups of audience members that match specified search attributes to be performed in real-time. Various embodiments described herein obviate the need to process all user IDs corresponding to all groups of audience members that match a search query, as was conventionally done to determine the number of unique audience members across the groups.

Figure 4:
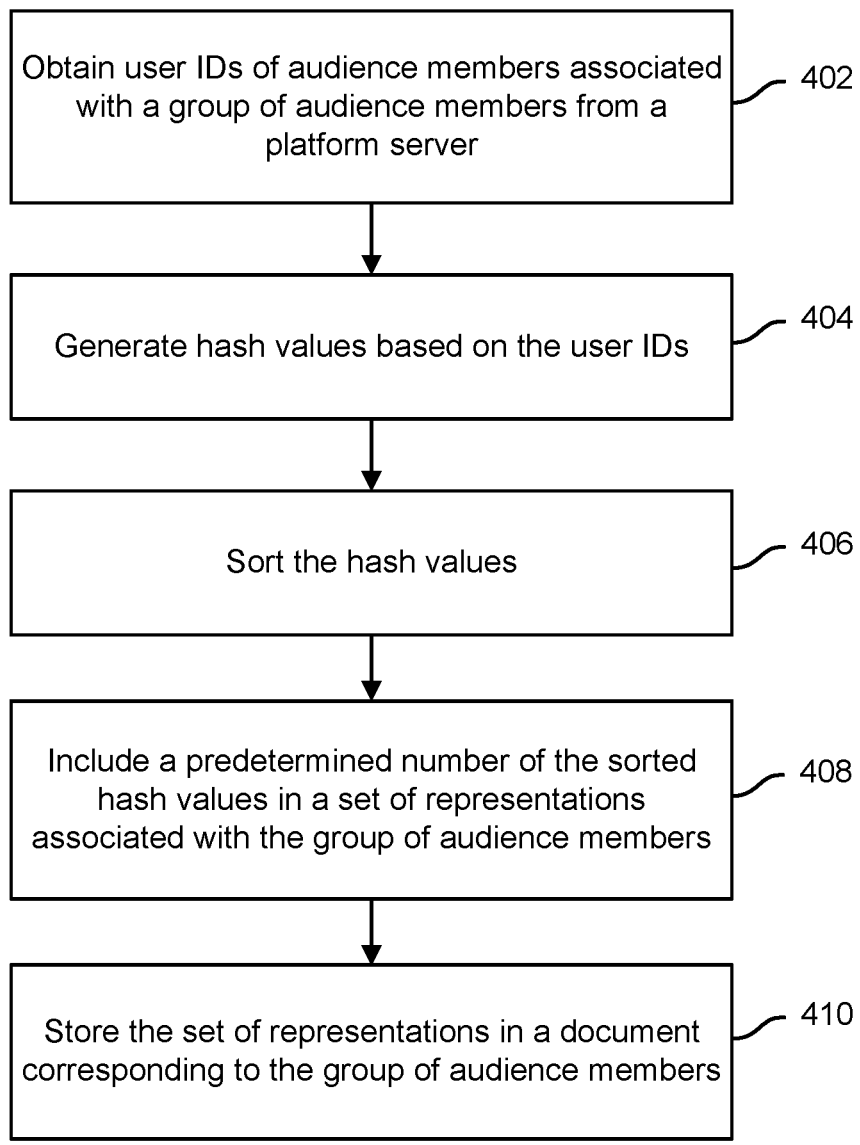
FIG. 4 is a flow diagram showing an example of a process for generating a set of representations corresponding to a group of audience members.

FIG. 4 is a flow diagram showing an example of a process for generating a set of representations corresponding to a group of audience members. In some embodiments, process 400 is implemented at system 100 of FIG. 1. Specifically, in some embodiments, process 400 is implemented at uniques determination server 108 and/or database server 106 of system 100 of FIG. 1.

At 402, user IDs of audience members associated with a group of audience members are obtained from a platform server. As mentioned above, in various embodiments, a group of audience members is defined as a set of users that match a given set of audience member criteria. For example, if the set of audience member criteria describes users that have viewed one or more videos that belong to the same channel at a platform server, then each group of audience members includes all the (not deduplicated) users that have viewed one or more videos belonging to each channel at the platform servers. In various embodiments, each user ID corresponds to a unique user/audience member. The user IDs within a group of audience members are not deduplicated, meaning that it is possible that the obtained user IDs pertaining to a group of audience members include duplicates of one or more user IDs.

At 404, hash values are generated based on the user IDs. In various embodiments, each user ID is input into one or more hash functions to generate a corresponding hash value. The same user ID will hash to the same hash value. In various embodiments, the hash function(s) are selected such that the inputs are uniformly distributed over the (normalized) range of [0, 1].

At 406, the hash values are sorted. The hash values are sorted by their magnitudes. For example, the hash values are ordered by the smallest hash value to the largest hash value. Either before or after the sorting operation, any duplicate hash values are discarded.

At 408, a predetermined number of the sorted hash values are included in a set of representations associated with the group of audience members. In various embodiments, a predetermined number, k, of the smallest hash values from the sorted hash values are included in a set of representations ("sketch") that is used to represent the audience members for the group. The predetermined number, k, is configurable. For example, k is configured to be 400. The greater the value of k, the lower the resulting error there is in the computation of the number of unique audience members.

The parameter of k can be selected based on a tradeoff between storage space efficiency and accuracy in approximating the number of unique audience members across groups of audience members. The smaller the value of k is, the fewer number of representations (e.g., hash values) that are stored for each group of audience members and thus, the faster and more scalable the overall system becomes. The larger the value of k is, the greater the accuracy with which the number of unique audience members can be determined. When estimating the number of unique audience members of a single video or channel, k is asymptotically proportional to the inverse of the square of the expected error. For example, k is $O(1/e^2)$, where e is the error. So, if the expected error is desired to be 5%, $k=1/0.05^2=400$ values are needed to be stored.

The following describes why the smallest k hash values are stored for each group of audience members: The quantity that is desired to be estimated for each group of audience members is the average distance between consecutive hash values (which would then be used to estimate the number of unique elements). To do so, any arbitrary group of consecutive k hash values can be stored, not just the k smallest hash values. But keeping the k smallest hash values makes the overall architecture simpler and thus easier to implement and maintain, and could also lead to more compact representations with minimal post-processing (compared to, for example, maintaining the maximum k hash values, which would usually require more bits per stored value).

At 410, the set of representations is stored in a document corresponding to the group of audience members. The set of representations (sketch) is stored in a document that is specific to the group of audience members. In various embodiments, the document also stores other group-specific attributes such as one or more of the following: keywords, the number of engagements (e.g., views), an identifier of the respective video or video channel, when the channel was created, etc. In various embodiments, the document is stored at a database that is configured to perform fast retrieval of documents.

Figure 5:
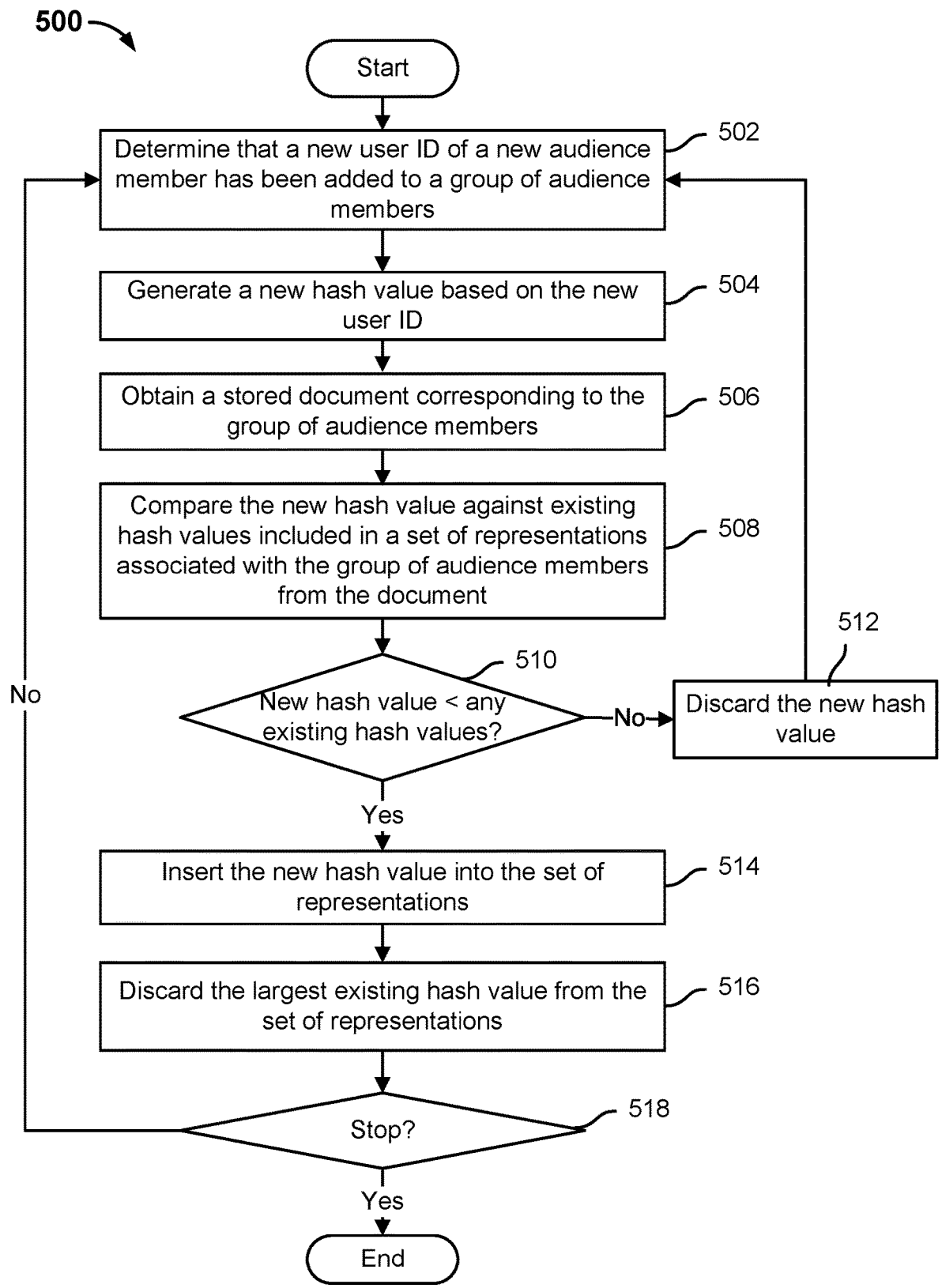
FIG. 5 is a flow diagram showing an example of a process for updating a set of representations corresponding to a group of audience members.

FIG. 5 is a flow diagram showing an example of a process for updating a set of representations corresponding to a group of audience members. In some embodiments, process 500 is implemented at system 100 of FIG. 1. Specifically, in some embodiments, process 500 is implemented at uniques determination server 108 and/or database server 106 of system 100 of FIG. 1.

At 502, a new user ID of an audience member that has been added to a group of audience members is determined. A new user ID has been obtained from a corresponding platform server for a group of audience members.

At 504, a new hash value is generated based on the new user ID. The new user ID is input into one or more hash functions to generate a hash value on the (normalized) scale of 0 to 1.

At 506, a stored document corresponding to the group of audience members is obtained. In some embodiments, the document corresponding to the group of audience members is stored by a database server.

At 508, the new hash value is compared against existing hash values included in a set of representations associated with the group of audience members from the document. The new hash value is compared against the existing hash values in the set of representations comprising a list of k sorted hash values that are stored in the document.

At 510, it is determined whether the new hash value is less than the largest existing hash value in the set of representations. In the event that the new hash value is less than the largest existing hash value in the set of representations, control is transferred to 514. Otherwise, in the event that the new hash value is not less than the largest existing hash value in the set of representations, control is transferred to 512.

At 512, the new hash value is discarded. If the new hash value is not smaller than any of the existing hash values, then the new hash value is discarded and the set of representations is not updated.

At 514, the new hash value is inserted into the set of representations. If the new hash value is less than the largest existing hash value, then the new hash value is inserted into its corresponding sorted position among the existing hash values and the largest existing hash value is discarded at 516.

At 518, it is determined whether to stop the process. For example, the process for determining whether a new user ID has been added to a group of audience members may be stopped when power to the system shuts down. In the event that process 500 should continue, control is returned to 502. Otherwise, in the event that process 500 should no longer continue, process 500 ends.

Process 500 shows that the set of representations corresponding to a group of audience members is easily updated when new user IDs are collected with respect to a group of audience members. As such, the set of representations corresponding to a group of audience members can be thought of as a running list of continuously updated data that can be used to estimate the number of unique audience members in the group.

In some embodiments, if it is determined that a user ID has been removed from a group of audience members, then it is determined whether a new set of representations would need to be generated for the group using a process such as process 400 of FIG. 4. For example, a hash value is first determined from the user ID that has been removed from the group of audience members. Then, the hash value of the removed user ID is compared to the set of k representations that are stored for the group of audience members. If that hash value was included in the set of k representations, then all the user IDs corresponding to that group of audience members would need to be collected again and a new set of k representations would need to be generated for the group using a process such as process 400 of FIG. 4. However, if that hash value was not included in the set of k representations, then that hash value can be ignored and the existing set of k representations would not need to be regenerated.

Figure 6:
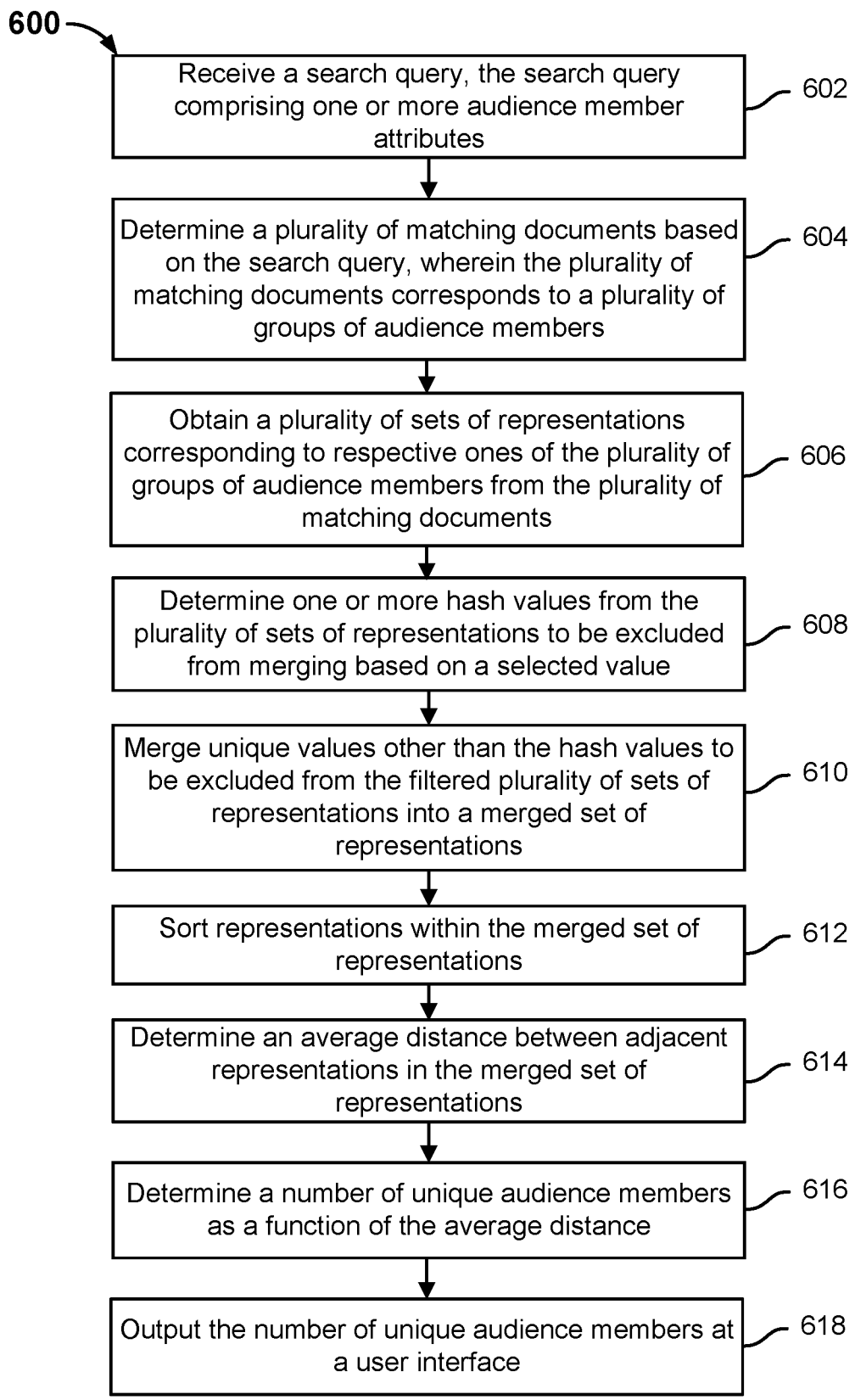
FIG. 6 is a flow diagram showing an example of a process for determining the number of unique audience members across a plurality of groups of audience members.

FIG. 6 is a flow diagram showing an example of a process for determining the number of unique audience members across a plurality of groups of audience members. In some embodiments, process 600 is implemented at system 100 of FIG. 1. Specifically, in some embodiments, process 600 is implemented at uniques determination server 108 and/or database server 106 of system 100 of FIG. 1. In some embodiments, process 300 of FIG. 3 is implemented, at least in part, using process 600.

At 602, a search query is received, the search query comprising one or more audience member attributes. In some embodiments, the search query includes attributes that describe a group of audience members. For example, attributes that describe a group of audience members may include the attributes of one or more items (e.g., videos) for which the users matched a set of audience member criteria. Specific examples of attributes included in a search query include, but are not limited to, keywords associated with the items (e.g., video titles or topics), when the items became available (e.g., when videos were uploaded), a minimum number of audience member engagements (e.g., views), and demographic attributes of audience members (e.g., age groups and/or gender).

At 604, a plurality of matching documents is determined based on the search query, wherein the plurality of matching documents corresponds to respective ones of a plurality of groups of audience members. In some embodiments, the search query is compared against the metadata, which includes audience member attributes, that is stored in each document that corresponds to a group of audience members. The group of audience members that corresponds to a matching document is a group of audience members that matches the search query.

At 606, a plurality of sets of representations corresponding to respective ones of the plurality of groups of audience members is obtained from the plurality of matching documents. In various embodiments, a running set of representations that can be used to determine the number of unique audience members in a group of audience members is stored in the document corresponding to that group. The respective set of representations is obtained from each matching document. In some embodiments, the set of representations corresponding to a group of audience members comprises a list of unique, k sorted hash values that were derived from at least some user IDs of users that are included in the group.

Figure 7:
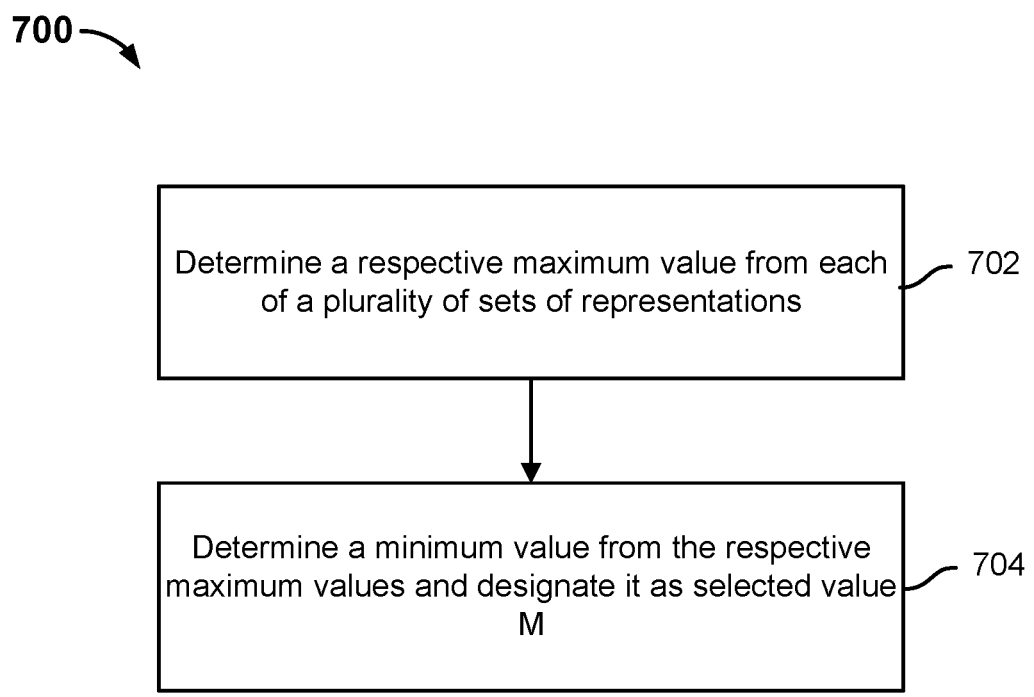
FIG. 7 is a flow diagram showing an example of a process for determining a selected value.

At 608, one or more hash values from the plurality of sets of representations are determined to be excluded from merging based on at least a selected value. In some embodiments, zero or more of the k (e.g., k=400) hash values from each set of representations are determined to be excluded from merging before the set of representations corresponding to the matching groups of audience members are merged together into a single set. A selected value, M, is selected from the sets of representations. FIG. 7, below, describes an example process for determining the selected value M. Selected value M is compared to each set of representations associated with a matching group of audience members and any hash value that is greater than M is determined to be excluded from merging into the merged set. One reason to exclude hash values in each set of representations from being included in the merged set is so that the resulting number of unique hash values in the merged set will be at least k but possibly greater than k. Especially when the number of unique audience members is to be determined across a large number of groups of audience members, capping the number of unique hash values in the merged set at k may fail to accurately capture the actual number of unique audience members. As such, by selecting to exclude some hash value(s) from the sets of representations based on the selected value M but merging all remaining hash values into a merged set that is not capped at the predetermined number k of hash values, the chance that the actual number of unique audience members across the groups of audience members can be accurately captured by the merged set of representations (e.g., hash values) is increased.

In some embodiments, in addition to filtering the at least some of the k (e.g., k=400) out of each set of representations associated with a matching group of audience members by selected value M before the sets of representations corresponding to the matching groups of audience members are combined, each set of representations may be filtered against another filtering value. In some embodiments, if the search query includes a demographic attribute (e.g., audience members that are from the United States), then a filtering value that corresponds to the demographic attribute is determined and used to filter out hash values from each set of representations corresponding to audience members that are predicted to not be from the United States. In some embodiments, filtering based on a filtering value is most appropriate for low cardinality attributes such that k, the number of representations in a set for a group of audience members, is greater than the number of possible attribute values and can therefore adequately capture the space of all potential attribute values.

At 610, unique values other than the one or more hash values to be excluded are merged from the plurality of sets of representations into a merged set of representations. Each remaining (non-excluded) hash value from the sets of representations is added into a merged set of representations. Put another way, a union operation is performed on the remaining hash values from the sets of representations. Any duplicate hash values are removed from the merged set of representations so that all the remaining hash values in the merged set of representations are unique.

At 612, representations within the merged set of representations are sorted. The unique hash values of the merged set of representations are also sorted by magnitude.

At 614, an average distance is determined between adjacent representations in the merged set of representations. The distance/difference between each pair of adjacent hash values in the sorted, merged set of representations is determined. Then, the average distance is determined by adding the distances together and dividing that sum by the number of distances that were added together.

At 616, a number of unique audience members across the plurality of audience members is determined as a function of the average distance. In some embodiments, the number of unique audience members across the plurality of groups of audience members is determined as one divided by the average distance that was determined in step 614. As mentioned above, because it is presumed that the hash function that was used to generate the hash values from user IDs for each group of audience members distributes its inputs uniformly across a range that can be normalized to [0, 1], the expected average distance between sorted, adjacent hash values should be one divided by the number of unique inputs (user IDs). Therefore, the number of unique audience members can be estimated as one divided by the computed average distance between sorted, adjacent hash values.

Alternatively, to determine the number of unique audience members across the plurality of audience members, one less than the number of hash values in the merged set is divided by the maximum hash value in the merged set of representations.

At 618, the number of unique audience members is output at a user interface. The number of unique audience members across the plurality of audience members may or may not be presented with other pieces of information, such as, for example, the number of non-unique audience members across the plurality of audience members.

FIG. 7 is a flow diagram showing an example of a process for determining a selected value. In some embodiments, process 700 is implemented at system 100 of FIG. 1. Specifically, in some embodiments, process 700 is implemented at uniques determination server 108 and/or database server 106 of system 100 of FIG. 1. In some embodiments, step 608 of process 600 of FIG. 6 is implemented, at least in part, using process 700.

At 702, a respective maximum value is determined from each of a plurality of sets of representations. In some embodiments, the largest hash value is determined from each set of representations that corresponds to a matching group of audience members.

At 704, a minimum value is determined from the respective maximum values and is designated as selected value M. As mentioned above, selected value M is used to determine which hash values from the sets of representations to exclude from being added into a merged set of representations. By selecting the value of M in the way that is described for process 700 and applying M in the manner as described in process 600 of FIG. 6, the resulting merged set of representations is not of a fixed size but is allowed to grow in a more flexible way. As such, the merged set of representations is more expressive and accurate, especially when representations from several, mostly disjoint, sets with similar densities are being merged.

FIG. 8 is a diagram showing an example of determining the number of unique audience members across a plurality of groups of audience members. In this example, groups of audience members A, B, and C have been determined to match a search query for a number of unique audience members. As such, the set of representations corresponding to each group of audience members A, B, and C is retrieved from each group's corresponding document. In this example, the predetermined number, k, of representations (hash values) within each group of the audience member's sets of representations is set to 4. Each hash value is a value in the range of [0, 1]. Before the three sets of representations are merged together, zero or more hash values are determined to be excluded from being added to a merged set based on a selected value M. In this example, M is determined to be the smallest value among each set of representation's largest hash values. Given that the largest hash values across the sets of representations are 0.4, 0.24, and 0.42 corresponding to groups of audience members A, B, and C, the smallest value therein, 0.24, is selected to be M. As such, each hash value within each set of representations that is greater than M=0.24 is to be filtered out and excluded from being merged into the merged set of representations. Specifically, 0.3 and 0.4 of the set of representations corresponding to the group of audience members A are to be excluded from the merged set and 0.35 and 0.42 of the set of representations corresponding to the group of audience members C are to be excluded from the merged set. The remaining hash values across the sets of representations corresponding to groups of audience members A, B, and C include: 0.1, 0.2, 0.05, 0.07, 0.2, 0.24, 0.01, and 0.02 and the unique hash values therein are: 0.1, 0.2, 0.05, 0.07, 0.24, 0.01, and 0.02. The remaining unique hash values are then merged into merged set of representations A+B+C and also sorted from smallest to largest value. The distance/difference between every pair of adjacent values in the merged set is computed. The resulting distances are: 0.01, 0.03, 0.02, 0.03, 0.1, and 0.04. The average distance is then determined as (0.01+0.03+0.02+0.03+0.1+0.04)/6=0.038. Then, the number of unique audience members across groups of audience members A, B, and C is estimated to be 1/0.038=26.3. Alternatively, the number of unique audience members across groups of audience members A, B, and C is estimated to be one less than the number of hash values in the merged set divided by the maximum hash value of the merged set (6/0.24)=25.

Figure 9:
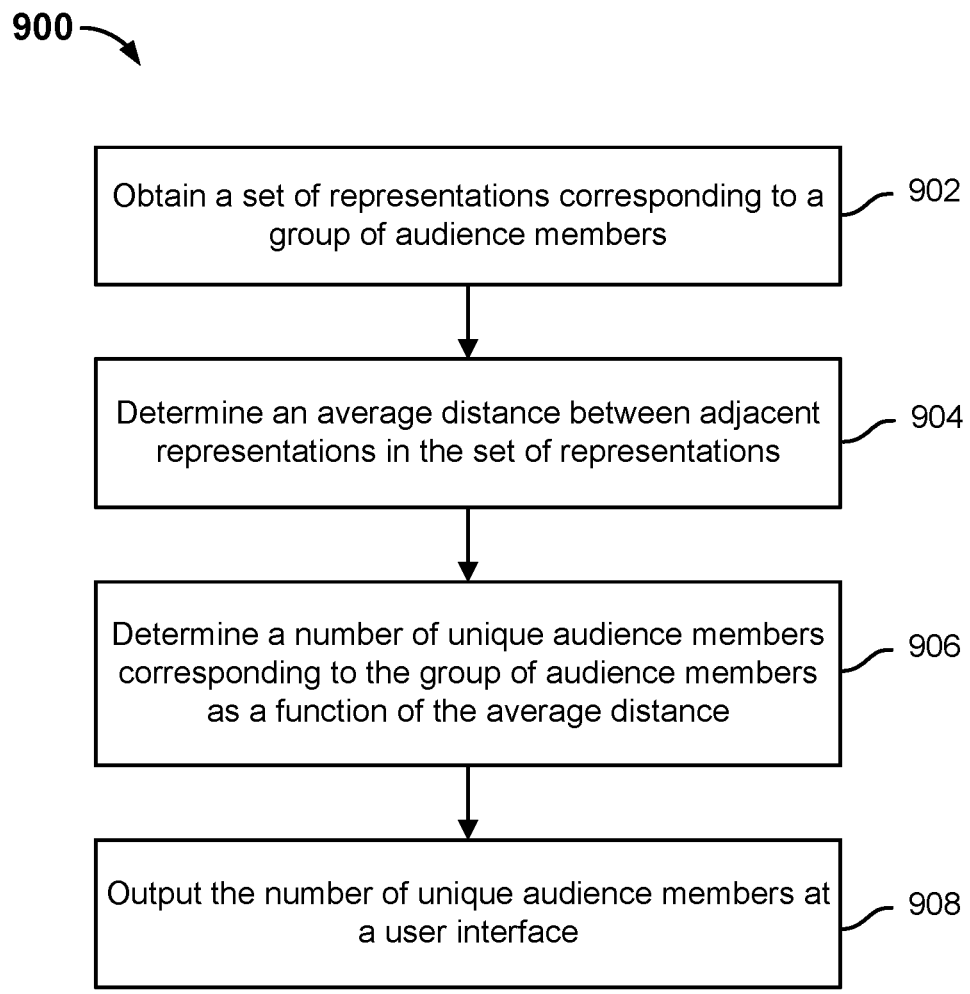
FIG. 9 is a flow diagram showing an example of a process for determining a number of unique audience members within a single group of audience members.

FIG. 9 is a flow diagram showing an example of a process for determining a number of unique audience members within a single group of audience members. In some embodiments, process 900 is implemented at system 100 of FIG. 1. Specifically, in some embodiments, process 900 is implemented at uniques determination server 108 and/or database server 106 of system 100 of FIG. 1.

At 902, a set of representations corresponding to a group of audience members is obtained. In some embodiments, a document corresponding to a group of audience members is determined to match a search query. The set of representations corresponding to the group of audience members is obtained from the document. As mentioned above, in various embodiments, a set of representations comprises a set of k unique, sorted hash values that were derived from users IDs corresponding to users that are included in the group of audience members.

At 904, an average distance is determined between adjacent representations in the set of representations. The distance/difference between every pair of adjacent values in the set of representations is computed. Then, the average distance is determined.

At 906, a number of unique audience members corresponding to the group of audience members is determined as a function of the average distance. In some embodiments, the number of unique audience members is determined as one divided by the average distance.

At 908, the number of unique audience members is output at a user interface. In some embodiments, the number of unique audience members corresponding to a single group of audience members is output at a user interface with one or more pieces of information, such as, for example, the number of unique audience members across multiple groups of audience members including the former group of audience members.

FIG. 10 is a diagram showing a table showing the estimated numbers of unique audience members that are determined for a set of channels. The example table of FIG. 10 compares the difference in error between the number of unique audience members that are estimated for groups of audience members corresponding to a respective number of video channels using the techniques described herein and using a naïve, conventional technique. In the table, column 1002, labeled "keyword(s)," describes keywords that were searched to find matching groups of audience members, where each group of audience members is found with respect to a channel of one or more videos. Column 1004, labeled "Number of Channels," describes the number of channels (and therefore, the number of groups of audience members) that was found to match the corresponding keyword of column 1002. Column 1006, labeled "Actual Unique Audience Members," describes the number of actual unique audience members that are included in the groups of audience members that correspond to the corresponding channels of column 1004. Column 1008, labeled "Described Unique Audience Members Estimate," describes the number of unique audience members that is estimated to be in the groups of audience members that correspond to the corresponding channels of column 1004 using various embodiments described herein. Column 1010, labeled "Naïve Unique Audience Members Estimate," describes the number of actual unique audience members that is estimated to be in the groups of audience members that correspond to the corresponding channels of column 1004 using a naïve, conventional solution (e.g., summing up the number of unique audience members that was determined for each channel). As shown in the example table, the number of unique audience members that are estimated using various embodiments described herein is associated with a low margin of error relative to the actual number, regardless of how many channels/groups of audience members for which the number is estimated. In contrast, the number of unique audience members that are estimated using the naïve solution is associated with a proportionally greater margin of error relative to the actual number as the number of channels/groups of audience members for which the number is estimated increases.

Various embodiments described herein significantly reduce the computations that are needed to determine the number of unique audience members across one or more groups of audience members. By leveraging lightweight precomputed data (sets of representations) for each group of audience members, the number of unique audience members across one or more groups of audience members can be quickly determined by merging at least some of their respective precomputed data. Therefore, the number of unique audience members across one or more groups of audience members can be queried and also determined in real-time.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
 a processor configured to:
  obtain user identifiers (IDs) of audience members associated with a first group of audience members from a platform server;
  generate hash values based at least in part on the user IDs;
  include up to a predetermined number of the hash values in a set of representations associated with the first group of audience members, wherein the set of representations associated with the first group of audience members excludes duplicate hash values;
  receive a search query for a number of unique audience members across a plurality of groups of audience members, wherein the plurality of groups of audience members includes the first group of audience members;
  obtain a plurality of sets of representations corresponding to respective ones of the plurality of groups of audience members;
  select at least a subset from each of the plurality of sets of representations;
  merge the selected at least subsets of the plurality of sets of representations into a merged set of representations;
  determine the number of unique audience members across the plurality of groups of audience members based at least in part on the merged set of representations; and
  output the number of unique audience members across the plurality of groups of audience members; and
 a memory coupled to the processor and configured to provide the processor with instructions.

2. The system of claim 1, wherein the processor is further configured to:
 sort the hash values,
 wherein the predetermined number of the hash values in the set of representations associated with the first group of audience members includes the sorted hash values; and
 store the set of representations in a document corresponding to the first group of audience members.

3. The system of claim 2, wherein the processor is further configured to:
 determine that a new user ID of a new audience member has been added to the first group of audience members;
 generate a new hash value based on the new user ID;
 obtain the document corresponding to the first group of audience members;

compare the new hash value against the sorted hash values in the set of representations associated with the first group of audience members;
determine that the new hash value is not smaller than a largest of the sorted hash values; and
in response to the determination that the new hash value is not smaller than the largest of sorted hash values, discard the new hash value without updating the set of representations.

4. The system of claim 2, wherein the processor is further configured to:
determine that a new user ID of a new audience member has been added to the first group of audience members;
generate a new hash value based on the new user ID;
obtain the document corresponding to the first group of audience members;
compare the new hash value against the sorted hash values in the set of representations associated with the first group of audience members;
determine that the new hash value is smaller than a largest of the sorted hash values; and
in response to the determination that the new hash value is smaller than the largest of the sorted hash values:
insert the new hash value into the set of representations; and
discard a largest existing hash value from the set of representations.

5. The system of claim 1, wherein to select the respective at least subset from each of the plurality of sets of representations comprises to:
determine a respective maximum value from each of the plurality of sets of representations;
determine a minimum value from the respective maximum values as a selected value; and
determine to select the at least subset from each of the plurality of sets of representations comprising values that are smaller than or equal to the selected value.

6. The system of claim 1, wherein the processor is further configured to:
determine a duplicate value within the merged set of representations; and
discard the duplicate value from the merged set of representations.

7. The system of claim 1, wherein to determine the number of unique audience members across the plurality of groups of audience members based at least in part on the merged set of representations comprises to:
determine a respective distance between each pair of adjacent values within the merged set of representations;
determine an average distance based on the respective distances; and
determine the number of unique audience members across the plurality of groups of audience members as a function of the average distance.

8. The system of claim 7, wherein the number of unique audience members across the plurality of groups of audience members is determined as a quotient of one divided by the average distance.

9. The system of claim 1, wherein to determine the number of unique audience members across the plurality of groups of audience members based at least in part on the merged set of representations is determined based at least in part on a maximum representation from the merged set of representations and a number of representations in the merged set of representations.

10. The system of claim 1, wherein the processor is further configured to determine a plurality of matching documents based at least in part on the search query, wherein the plurality of matching documents corresponds to respective ones of the plurality of groups of audience members, wherein the plurality of sets of representations is stored in respective ones of the plurality of matching documents.

11. A method, comprising:
obtaining user identifiers (IDs) of audience members associated with a first group of audience members from a platform server;
generating hash values based at least in part on the user IDs;
including up to a predetermined number of the hash values in a set of representations associated with the first group of audience members, wherein the set of representations associated with the first group of audience members excludes duplicate hash values;
receiving a search query for a number of unique audience members across a plurality of groups of audience members, wherein the plurality of groups of audience members includes the first group of audience members;
obtaining a plurality of sets of representations corresponding to respective ones of the plurality of groups of audience members;
selecting at least a subset from each of the plurality of sets of representations;
merging the selected at least subsets of the plurality of sets of representations into a merged set of representations;
determining the number of unique audience members across the plurality of groups of audience members based at least in part on the merged set of representations; and
outputting the number of unique audience members across the plurality of groups of audience members.

12. The method of claim 11, further comprising:
sorting the hash values,
wherein the predetermined number of the hash values in the set of representations associated with the first group of audience members includes the sorted hash values; and
storing the set of representations in a document corresponding to the first group of audience members.

13. The method of claim 12, further comprising:
determining that a new user ID of a new audience member has been added to the first group of audience members;
generating a new hash value based on the new user ID;
obtaining the document corresponding to the first group of audience members;
comparing the new hash value against the sorted hash values in the set of representations associated with the first group of audience members;
determining that the new hash value is not smaller than a largest of the sorted hash values; and
in response to the determination that the new hash value is not smaller than the largest of sorted hash values, discarding the new hash value without updating the set of representations.

14. The method of claim 12, further comprising:
determining that a new user ID of a new audience member has been added to the first group of audience members;
generating a new hash value based on the new user ID;
obtaining the document corresponding to the first group of audience members;
comparing the new hash value against the sorted hash values in the set of representations associated with the first group of audience members;

determining that the new hash value is smaller than a largest of the sorted hash values; and in response to the determination that the new hash value is smaller than the largest of the sorted hash values:

inserting the new hash value into the set of representations; and discarding a largest existing hash value from the set of representations.

15. The method of claim 11, wherein selecting the respective at least subset from each of the plurality of sets of representations comprises:

determining a respective maximum value from each of the plurality of sets of representations;

determining a minimum value from the respective maximum values as a selected value; and determining to select the at least subset from each of the plurality of sets of representations comprising values that are smaller than or equal to the selected value.

16. The method of claim 11, further comprising:

determining a duplicate value within the merged set of representations; and discarding the duplicate value from the merged set of representations.

17. The method of claim 11, wherein determining the number of unique audience members across the plurality of groups of audience members based at least in part on the merged set of representations comprises:

determining a respective distance between each pair of adjacent values within the merged set of representations;

determining an average distance based on the respective distances; and determining the number of unique audience members across the plurality of groups of audience members as a function of the average distance.

18. The method of claim 17, wherein the number of unique audience members across the plurality of groups of audience members is determined as a quotient of one divided by the average distance.

19. The method of claim 11, wherein determining the number of unique audience members across the plurality of groups of audience members based at least in part on the merged set of representations is determined based at least in part on a maximum representation from the merged set of representations and a number of representations in the merged set of representations.

20. A computer program product, the computer program product comprising a non-transitory computer readable storage medium and comprising computer instructions for:

obtaining user identifiers (IDs) of audience members associated with a first group of audience members from a platform server;

generating hash values based at least in part on the user IDs;

including up to a predetermined number of the hash values in a set of representations associated with the first group of audience members, wherein the set of representations associated with the first group of audience members excludes duplicate hash values;

receiving a search query for a number of unique audience members across a plurality of groups of audience members, wherein the plurality of groups of audience members includes the first group of audience members;

obtaining a plurality of sets of representations corresponding to respective ones of the plurality of groups of audience members;

selecting at least a subset from each of the plurality of sets of representations;

merging the selected at least subsets of the plurality of sets of representations into a merged set of representations;

determining the number of unique audience members across the plurality of groups of audience members based at least in part on the merged set of representations; and outputting the number of unique audience members across the plurality of groups of audience members.

\* \* \* \* \*